(12) United States Patent
Yamada

(10) Patent No.: US 8,649,599 B2
(45) Date of Patent: Feb. 11, 2014

(54) IMAGE PROCESSING APPARATUS, IMAGE PROCESSING METHOD, AND PROGRAM

(75) Inventor: Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 13/120,093

(22) PCT Filed: Jul. 23, 2010

(86) PCT No.: PCT/JP2010/062397
§ 371 (c)(1),
(2), (4) Date: Mar. 21, 2011

(87) PCT Pub. No.: WO2011/013579
PCT Pub. Date: Feb. 3, 2011

(65) Prior Publication Data
US 2012/0114240 A1    May 10, 2012

(30) Foreign Application Priority Data
Jul. 30, 2009    (JP) .............................. P2009-177581

(51) Int. Cl.
*G06K 9/34*    (2006.01)
(52) U.S. Cl.
USPC .......................................................... 382/173
(58) Field of Classification Search
None
See application file for complete search history.

(56) References Cited

U.S. PATENT DOCUMENTS

| | | | |
|---|---|---|---|
| 7,430,339 B2 * | 9/2008 | Rother et al. ................. | 382/284 |
| 2006/0029275 A1 * | 2/2006 | Li et al. ......................... | 382/173 |
| 2006/0039611 A1 * | 2/2006 | Rother et al. ................. | 382/199 |
| 2009/0196349 A1 * | 8/2009 | Park et al. ................. | 375/240.12 |

FOREIGN PATENT DOCUMENTS

| | | |
|---|---|---|
| EP | 1 526 481 A2 | 4/2005 |
| EP | 1 624 413 A2 | 2/2006 |
| EP | 1 626 371 A1 | 2/2006 |
| JP | 2006-53919 | 2/2006 |
| JP | 2006-53921 | 2/2006 |

OTHER PUBLICATIONS

Supplementary European Search Report in Application No. 10804325.8 dated Nov. 22, 2012, 5 pages.

(Continued)

*Primary Examiner* — Sean Motsinger
(74) *Attorney, Agent, or Firm* — Finnegan, Henderson, Farabow, Garrett & Dunner, LLP

(57) ABSTRACT

The present invention relates to an image processing apparatus, an image processing method, and a program capable of obtaining, even if a process such as a graph cut method is performed in units of small regions, a result similar to that obtained in the process performed in units of pixels.

A pre-segmentation executing unit 13 classifies pixels in an image on the basis of correlation among the pixels, thereby dividing the image into a set of small regions. A small region adjacent energy calculating unit 14 calculates a small region adjacent energy on the basis of a difference in pixel value of a pixel set at the vicinity of a boundary of a pair of small regions adjacent to each other in the set of small regions. A small region likelihood energy calculating unit 15 selects object regions and background regions for the respective small regions on the basis of a trimap image, constructs a probability model function, and calculates object likelihoods and background likelihoods for the respective small regions. A segmentation executing unit 16 divides the image into a binary mask image of a foreground and a background using a small region adjacent energy and a small region likelihood energy. The present invention can be applied to image processing of separating an object image.

6 Claims, 10 Drawing Sheets

(56) References Cited

OTHER PUBLICATIONS

Li et al.; "Lazy Snapping", ACM Transaction, Graphics, pp. 303-308, (2004).

English-language translation of International Search Report from the Japanese Patent Office for International Application No. PCT/JP2010/062397, mailing date Aug. 17, 2010.

* cited by examiner

IMAGE PROCESSING APPARATUS, IMAGE PROCESSING METHOD, AND PROGRAM

TECHNICAL FIELD

The present invention relates to an image processing apparatus, an image processing method, and a program, and particularly relates to an image processing apparatus, an image processing method, and a program that are capable of increasing the speed of a process of generating a binary mask image made up of an object region and a background region from an input image and realizing the process by saving a memory.

BACKGROUND ART

A process of obtaining a binary mask image, which specifies an object region and a background region in an image, is referred to as an image segmentation process. As one method for this image segmentation process, a graph cut method is known (see NPL 1).

In this graph cut method, an entire image is expressed by a graph structure, with information about a color distribution and edges of the image being energy, a maximum flow problem (Maxflow) thereof is solved, and labels of zero and one are assigned so that the energy is minimized, thereby obtaining a binary mask image.

However, the memory usage for holding this graph structure for all the pixels in the memory is very large, and the resolution of an image to be processed is limited.

One of methods for solving such a problem is an idea of performing the graph cut method with a little larger granularity than units of pixels, for example, in units of small regions, such as sets of pixels.

Originally, in the graph cut method, no restriction is given to the connection state among nodes of a graph, and free connection is permitted. Thus, the graph cut method can be applied as is by freely forming small regions and by replacing pixels by the small regions. Note that the energy that is set to the nodes and edges of the graph needs to be calculated in a method different from that in units of pixels.

A method for defining such a set of small regions and applying the graph cut method is suggested in NPL 2 and PTL 1. In this method, an adjacent energy and a likelihood energy between pixels are calculated using an average color of a small region.

In this method, the graph cut method is performed in units of small regions the number of which is smaller than the number of pixels. Accordingly, memory saving and higher speed are realized, and also the amount of calculation of two types of energy is reduced.

CITATION LIST

Patent Literature

PTL 1: "Systems and methods for image data separation", EP 1 624 413 A2 (June 2006)

Non Patent Literature

NPL 1: "An Experimental Comparison of Min-Cut/Max-Flow Algorithms for Energy Minimization in Vision" (2004), Yuri Boykov, Vladimir Kolmogorov, IEEE Transactions on Pattern Analysis and Machine Intelligence
NPL 2: "Lazy snapping" (2004), Yin Li, Jian Sun, Chi-Keung Tang, Heung-Yeung Shum, ACM Transaction. Graphics.

SUMMARY OF INVENTION

Technical Problem

However, in the methods suggested in NPL 2 and PTL 1, both energies are calculated using an average color of a small region, and thus the difference therebetween is large compared to that in the calculation performed in units of pixels. Accordingly, a binary mask image, which is a processing result of the graph cut method, cannot be obtained well in some cases.

The present invention has been made in view of such circumstances, and is directed to increasing the speed of a process of generating a binary mask image made up of an object region and a background region from an input image and realizing the process by saving a memory, and is also directed to obtaining, even if an image segmentation process such as the graph cut method is performed in units of small regions, a result similar to that obtained in the process performed in units of pixels.

Solution to Problem

An image processing apparatus according to an aspect of the present invention is an image processing apparatus for outputting a binary mask image in which an image is separated into an object and a background region, and includes trimap image obtaining means for obtaining the image and a trimap image in which the image is divided into an object region, a background region, and the other region, pre-dividing means for classifying pixels in the image on the basis of correlation among the pixels, thereby dividing the image into a set of small regions, small region adjacent energy calculating means for calculating a small region adjacent energy on the basis of a difference in pixel value of a pixel set at the vicinity of a boundary of a pair of small regions adjacent to each other in the set of small regions, small region likelihood energy calculating means for selecting the object region and background region in the set of small regions on the basis of the trimap image, constructing a probability model function, obtaining object likelihoods and background likelihoods of the respective sets of small regions using the probability model function, and calculating a small region likelihood energy using the object likelihoods and the background likelihoods, dividing means for dividing the image into a binary mask image of the foreground and the background using the small region adjacent energy and the small region likelihood energy, and output means for outputting the binary mask image divided by the dividing means.

The small region likelihood energy calculating means can be caused to calculate the object likelihoods and the background likelihoods using the probability model function using weighted average colors of the respective sets of small regions.

The pre-dividing means can be caused to further include small region center selecting means for setting pixels having a minimum value of a pixel value in a forward direction of raster scan as the small region center candidate pixels among the individual pixels in the image, and then selecting a pixel having a minimum value in a reverse direction of the raster scan as the small region center from among the small region center candidate pixels.

The small region center selecting means can be caused to further include differential processing means for performing a differential process on the image, and can be caused to set a pixel value equal to or smaller than a desired threshold among pixel values of respective pixels of the image on which the differential process has been performed by the differential processing means to zero, thereby performing output by reducing the number of pixels at the small region center.

The pre-dividing means can be caused to further include small region extending processing means for setting order of extending the small region to ascending order of quantized pixel value.

An image processing method according to an aspect of the present invention is an image processing method for an image processing apparatus for outputting a binary mask image in which an image is separated into an object and a background region, and includes a trimap image obtaining step of obtaining the image and a trimap image in which the image is divided into an object region, a background region, and the other region, a pre-dividing step of classifying pixels in the image on the basis of correlation among the pixels, thereby dividing the image into a set of small regions, a small region adjacent energy calculating step of calculating a small region adjacent energy on the basis of a difference in pixel value of a pixel set at the vicinity of a boundary of a pair of small regions adjacent to each other in the set of small regions, a small region likelihood energy calculating step of selecting the object region and background region in the set of small regions on the basis of the trimap image, constructing a probability model function, obtaining object likelihoods and background likelihoods of the respective sets of small regions using the probability model function, and calculating a small region likelihood energy using the object likelihoods and the background likelihoods, a dividing step of dividing the image into a binary mask image of the foreground and the background using the small region adjacent energy and the small region likelihood energy, and an output step of outputting the binary mask image divided in a process of the dividing step.

A program according to an aspect of the present invention is a program causing a computer that controls an image processing apparatus for outputting a binary mask image in which an image is separated into an object and a background region to execute a process including a trimap image obtaining step of obtaining the image and a trimap image in which the image is divided into an object region, a background region, and the other region, a pre-dividing step of classifying pixels in the image on the basis of correlation among the pixels, thereby dividing the image into a set of small regions, a small region adjacent energy calculating step of calculating a small region adjacent energy on the basis of a difference in pixel value of a pixel set at the vicinity of a boundary of a pair of small regions adjacent to each other in the set of small regions, a small region likelihood energy calculating step of selecting the object region and background region in the set of small regions on the basis of the trimap image, constructing a probability model function, obtaining object likelihoods and background likelihoods of the respective sets of small regions using the probability model function, and calculating a small region likelihood energy using the object likelihoods and the background likelihoods, a dividing step of dividing the image into a binary mask image of the foreground and the background using the small region adjacent energy and the small region likelihood energy, and an output step of outputting the binary mask image divided in a process of the dividing step.

In an aspect of the present invention, an image and a trimap image in which the image is divided into an object region, a background region, and the other region are obtained, pixels in the image are classified on the basis of correlation among the pixels, whereby the image is divided into a set of small regions, a small region adjacent energy is calculated on the basis of a difference in pixel value of a pixel set at the vicinity of a boundary of a pair of small regions adjacent to each other in the set of small regions, the object region and background region in the set of small regions are selected on the basis of the trimap image, a probability model function is constructed, object likelihoods and background likelihoods of the respective sets of small regions are obtained using the probability model function, a small region likelihood energy is calculated using the object likelihoods and the background likelihoods, the image is divided into a binary mask image of the foreground and the background using the small region adjacent energy and the small region likelihood energy, and the divided binary mask image is output.

Advantageous Effects of Invention

According to the present invention, even if an image segmentation process such as the graph cut method is performed in units of small regions, a result similar to that obtained in the process performed in units of pixels can be obtained.

DESCRIPTION OF EMBODIMENTS

[Configuration Example of Image Segmentation Apparatus]

Figure 1:
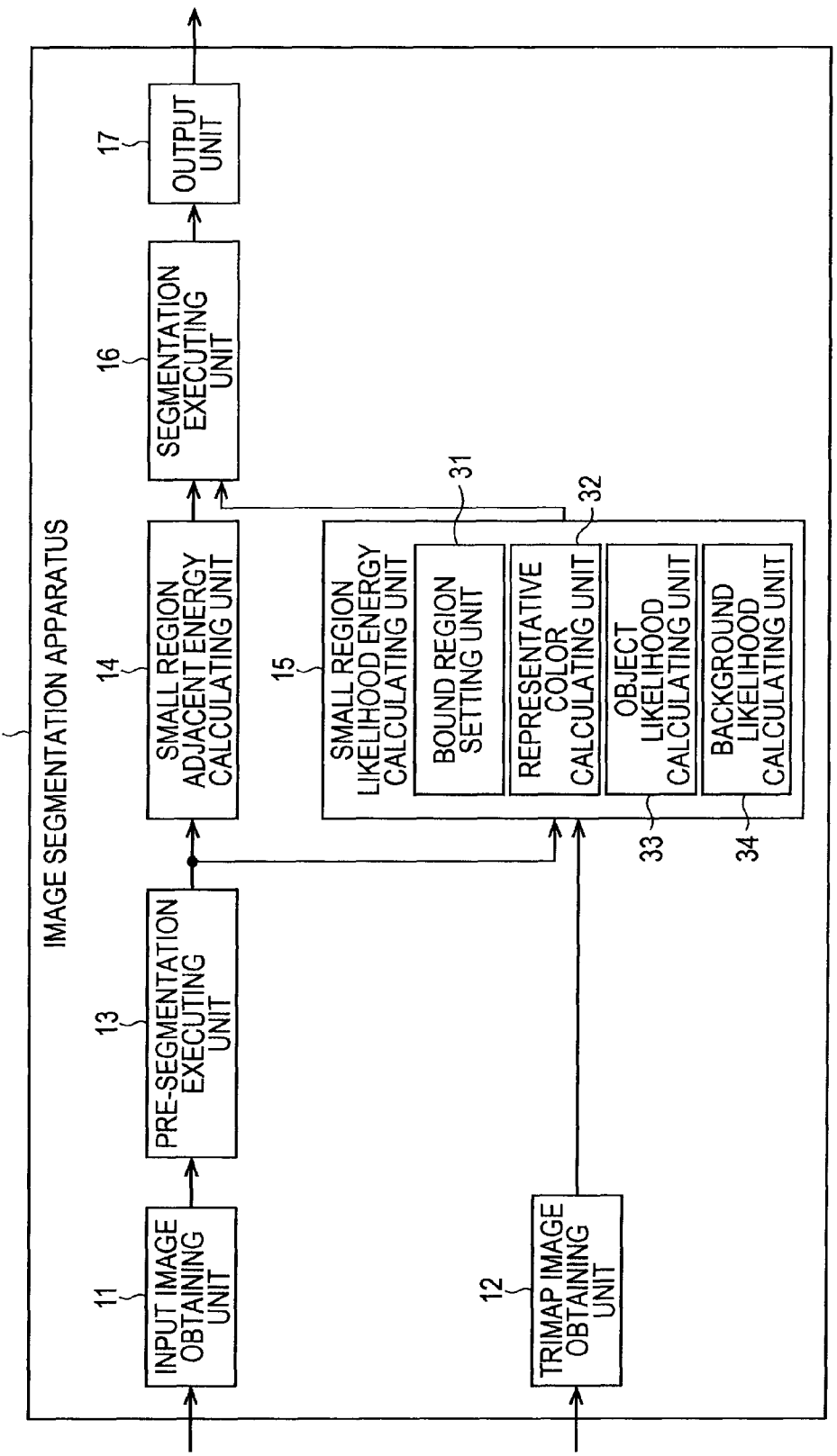
FIG. 1 is a diagram illustrating a configuration example of an embodiment of an image segmentation apparatus to which the present invention is applied.

FIG. 1 is a diagram illustrating a configuration example of an embodiment of an image segmentation apparatus to which the present invention is applied.

The image segmentation apparatus 1 transforms an input image into an image made up of a group of small regions each of which is made up of a plurality of pixels by using the input image and a trimap image in which the pixels of the input image are classified into any of an object pixel, a background pixel, and the other pixel. Also, the image segmentation apparatus 1 executes image segmentation in units of the small regions, that is, separates the image into an object and a background in units of small regions, thereby generating and outputting a binary mask image.

The image segmentation apparatus 1 includes an input image obtaining unit 11, a trimap image obtaining unit 12, a pre-segmentation executing unit 13, a small region adjacent energy calculating unit 14, a small region likelihood energy calculating unit 15, a segmentation executing unit 16, and an output unit 17.

The input image obtaining unit 11 obtains a normal input image and supplies it to the pre-segmentation executing unit 13. The trimap image obtaining unit 12 obtains an input image and a trimap image made up of information in which the pixels of the input image are classified into any of an object pixel, a background pixel, and the other pixel, and supplies them to the small region likelihood energy calculating unit 15.

The pre-segmentation executing unit 13 first divides the input image supplied thereto into small regions, each being made up of a plurality of adjacent pixels. Then, the pre-segmentation executing unit 13 sets small region IDs (identifiers) of the respective small regions to generate a small region ID map, and supplies it to the small region adjacent energy calculating unit 14 and the small region likelihood energy calculating unit 15. At this time, the pre-segmentation executing unit 13 supplies the input image, together with the small region ID map, to the small region adjacent energy calculating unit 14 and the small region likelihood energy calculating unit 15. Note that a detained configuration of the pre-segmentation executing unit 13 will be described below with reference to FIG. 2.

The small region adjacent energy calculating unit 14 obtains adjacent energies using the pixel values of pixels positioned at the boundaries between the small regions on the basis of the small region ID map, which is made up of the small region IDs that identify the respective small regions, and the input image, and calculates the integration value of these small regions as a small region adjacent energy. The small region adjacent energy calculating unit 14 supplies the calculated small region adjacent energy to the segmentation executing unit 16.

The small region likelihood energy calculating unit 15 calculates a small region likelihood energy on the basis of the input image and small region ID map supplied from the pre-segmentation executing unit 13 and the trimap image supplied from the trimap image obtaining unit 12.

More specifically, the small region likelihood energy calculating unit 15 includes a bound region setting unit 31, a representative color calculating unit 32, an object likelihood calculating unit 33, and a background likelihood calculating unit 34. The bound region setting unit 31 binds a small region made up of pixels of an object image to the object image, and binds a small region made up of pixels of a background image to the background image. As for a small region including pixels of the both images, the bound region setting unit 31 divides the small region without contradiction or does not bind the small region to any of the images. The representative color calculating unit 32 obtains a weighted average of color information of the pixels constituting a small region as a representative color of the small region. The object likelihood calculating unit 33 obtains a function of a Gaussian probability model in units of small regions bound to the object image, and calculates the likelihood of the object as object likelihood using the function of the Gaussian probability model. The background likelihood calculating unit 34 obtains a function of a Gaussian probability model in units of small regions bound to the background image, and calculates the likelihood of the background as background likelihood using the function of the Gaussian probability model.

Then, the small region likelihood energy calculating unit 15 calculates a small region likelihood energy using the object likelihoods of the small regions bound to the object image and the background likelihoods of the small regions bound to the background image. The small region likelihood energy calculating unit 15 supplies the calculated small region likelihood energy to the segmentation executing unit 16. Note that the details of the small region adjacent energy and the small region likelihood energy will be described below.

The segmentation executing unit 16 obtains the input image, small region ID map, small region adjacent energy, and small region likelihood energy that are supplied from the small region adjacent energy calculating unit 14 and the small region likelihood energy calculating unit 15. Then, the segmentation executing unit 16 executes image segmentation, thereby generating a binary mask image on the basis of the input image, small region ID map, small region adjacent energy, and small region likelihood energy, and supplies it to the output unit 17.

The output unit 17 outputs the binary mask image supplied thereto as a processing result.

[Configuration Example of Pre-Segmentation Executing Unit]

Figure 2:
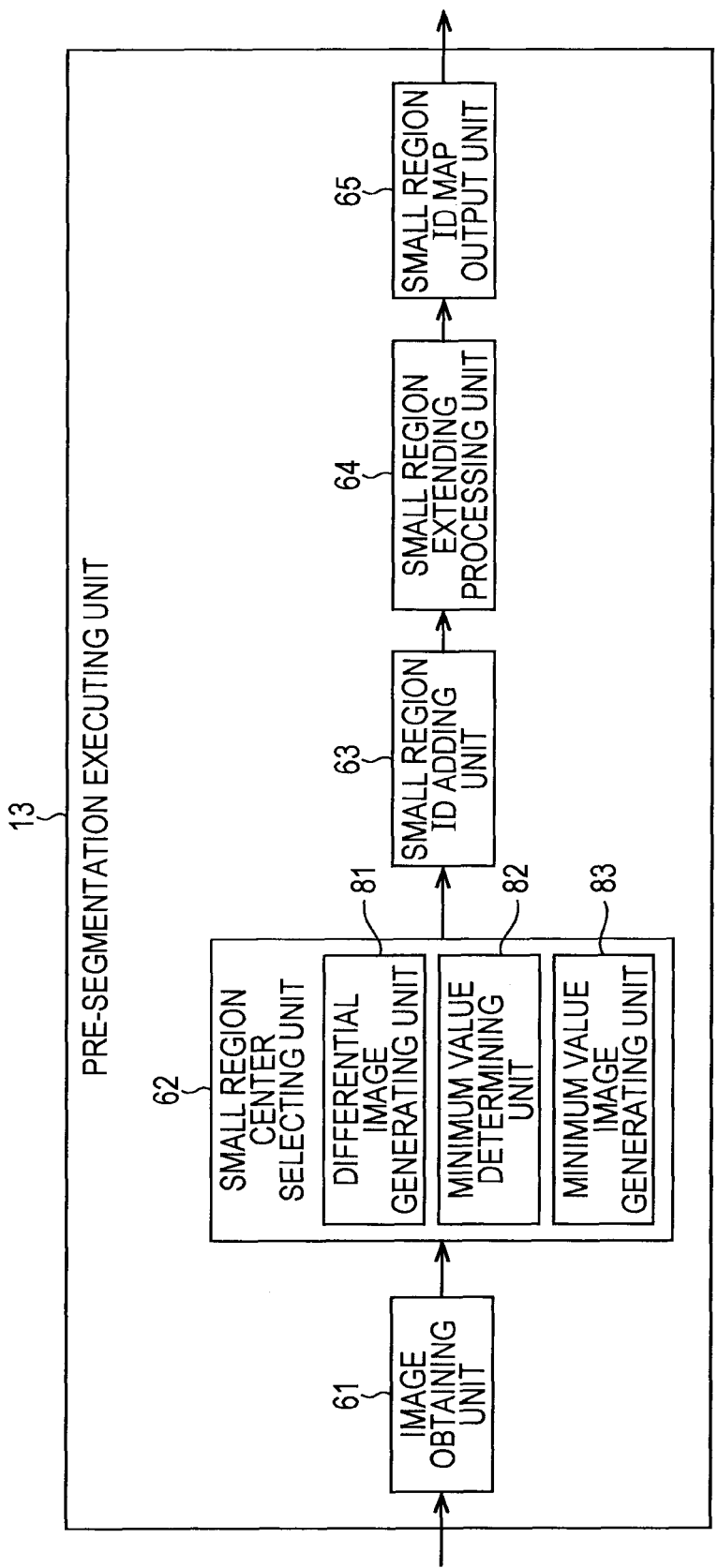
FIG. 2 is a diagram illustrating a configuration example of a pre-segmentation executing unit in FIG. 1.

Next, a detailed configuration of the pre-segmentation executing unit 13 will be described with reference to FIG. 2.

The pre-segmentation executing unit 13 includes an image obtaining unit 61, a small region center selecting unit 62, a small region ID adding unit 63, a small region extending processing unit 64, and a small region ID map output unit 65.

The image obtaining unit 61 obtains an input image and supplies it to the small region center selecting unit 62. The small region center selecting unit 62 includes a differential image generating unit 81, a minimum value determining unit 82, and a minimum value image generating unit 83. The small region center selecting unit 62 selects, when forming small regions from the input image, pixels at the centers thereof. More specifically, the differential image generating unit 81 is a Sobel operator filter or the like, for example, and generates a differential image by processing the individual pixels of the input image. The minimum value determining unit 82 detects a minimum value pixel on the basis of a difference in pixel value between pixels that are adjacent to each other in raster scan order among the individual pixels of the differential image. The minimum value image generating unit 83 generates a minimum value image from the pixels that are determined to have a minimum value by the minimum value determining unit 82. The minimum value determining unit 82 supplies the minimum value image to the small region ID adding unit 63.

The small region ID adding unit 63 regards the individual pixels that are set as the minimum value of the minimum value image supplied from the small region center selecting unit 62 as the pixels selected as the centers of the small regions, and adds small region IDs to the respective pixels selected as the centers of the small regions, thereby generating an initial small region ID map. Also, the small region ID adding unit 63 supplies the generated initial small region ID map and the input image to the small region extending processing unit 64.

The small region extending processing unit 64 causes the small region IDs to gradually propagate to the pixels that are not selected as the centers of the small regions in ascending order of pixel value for the individual pixels selected as the centers of the small regions in accordance with the initial small region ID map, thereby extending the small regions from the centers of the small regions to generate a small region ID map. Also, the small region extending processing unit 64 supplies the generated small region ID map and the input image to the small region ID map output unit 65. The small region ID map output unit 65 supplies the generated small region ID map and the input image to the small region adjacent energy calculating unit 14 and the small region likelihood energy calculating unit 15.

[Regarding Image Segmentation Process]

Next, an image segmentation process will be described with reference to the flowchart in FIG. 3.

In step S1, the input image obtaining unit 11 obtains a normal image as an input image and supplies it to the pre-segmentation executing unit 13. The normal input image is the image illustrated in the left portion of FIG. 4, for example. In the left portion of FIG. 4, an image of a swallowtail butterfly on a leaf is illustrated. Note that, hereinafter, a description will be given under the assumption that this swallowtail butterfly is an object image in the input image and that the image in the other part is a background image. Note that the input image is not limited to this image, and another image may also be applied. Also, the object image is not limited to the swallowtail butterfly, and another image may also be applied.

In step S2, the trimap image obtaining unit 12 obtains a trimap image in which the pixels of the input image are classified into any of an object pixel, a background pixel, and the other pixel, and supplies it to the small region likelihood energy calculating unit 15. More specifically, the trimap image is an image that is formed by tracing the outline portion of the swallowtail butterfly as an object using a touch pen of a certain thickness in FIG. 4, for example. In such a case, the pixels in the region constituting the object image are the pixels in the region of the swallowtail butterfly surrounded with the touch pen. Also, the background image corresponds to the pixels in the outer region that is not surrounded with the touch pen. Other than that, that is, the pixels in the boundary region on the line of the touch pen, are not classified into any of them.

In step S3, the pre-segmentation executing unit 13 executes a pre-segmentation process to generate a small region ID map, and supplies it to the small region adjacent energy calculating unit 14 and the small region likelihood energy calculating unit 15.

[Regarding Pre-Segmentation Process]

Figure 5:
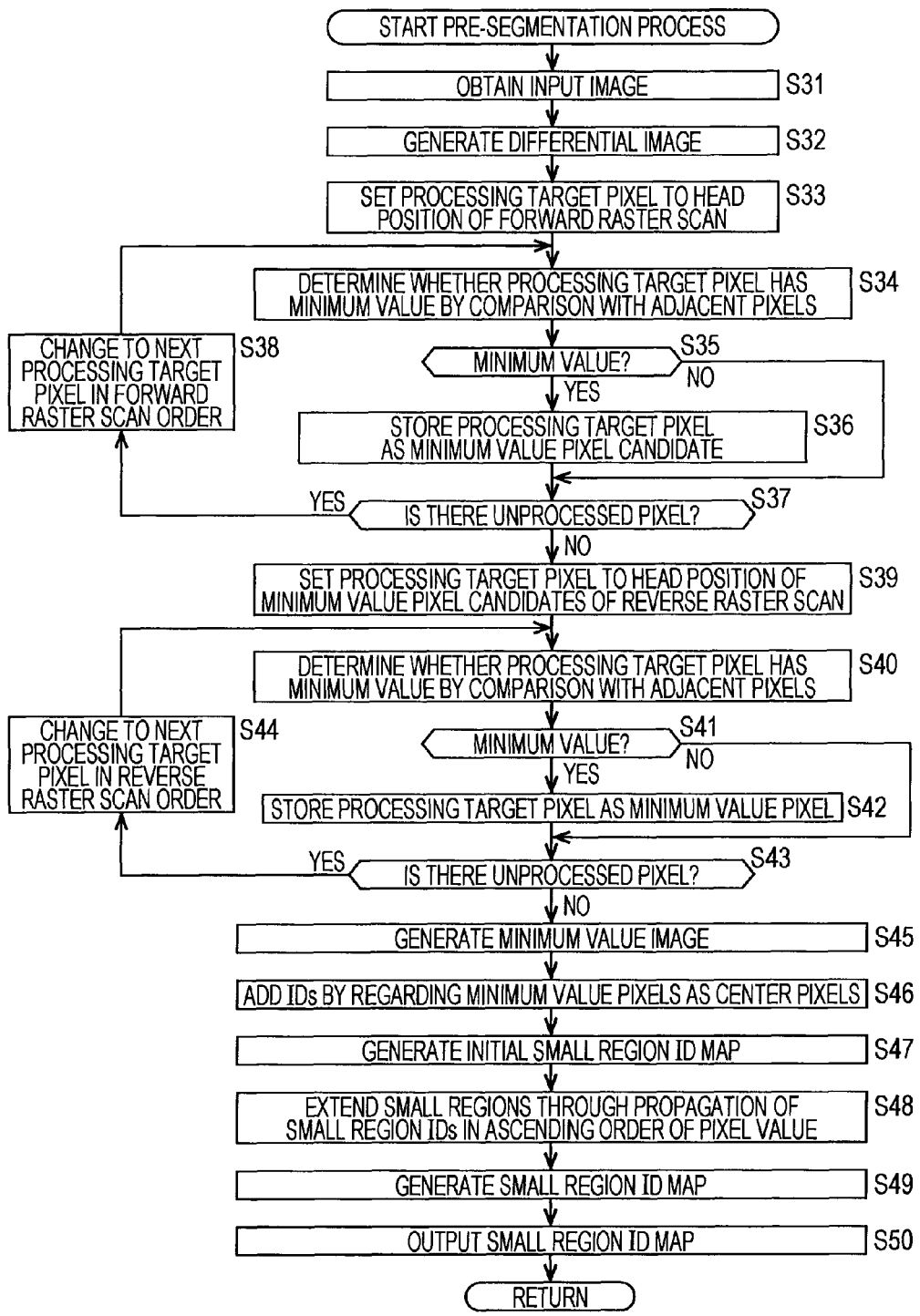
FIG. 5 is a flowchart for explaining a pre-segmentation process.

Now, the pre-segmentation process will be described with reference to FIG. 5.

In step S31, the image obtaining unit 61 obtains the input image and supplies it to the small region center selecting unit 62.

In step S32, the small region center selecting unit 62 controls the differential image generating unit 81 to generate a differential image. The differential image generating unit 81 is a Sobel filter expressed by the following equation (1), for example.

[Math. 1]

$$G_y = \begin{bmatrix} +1 & +2 & +1 \\ 0 & 0 & 0 \\ -1 & -2 & -1 \end{bmatrix} * A \quad (1)$$

$$G_x = \begin{bmatrix} +1 & 0 & -1 \\ +2 & 0 & -2 \\ +1 & 0 & -1 \end{bmatrix} * A$$

$$G = \sqrt{G_x^2 + G_y^2}$$

Here, Gy represents a processing result obtained by processing a matrix A using a Sobel filter in the vertical direction made up of the values +1, +2, and +1 from the left in the upper stage, the values 0, 0, and 0 from the left in the middle stage, and the values −1, −2, and −1 from the left in the lower stage.

Additionally, the matrix A is a matrix made up of the pixel values in a region of three pixels×three pixels, including a target pixel at the center, and upper, lower, left, right, upper-left, upper-right, lower-left, and lower-right pixels adjacent to the target pixel.

Also, Gx represents a processing result obtained by processing the matrix A using a Sobel filter in the horizontal direction made up of the values +1, 0, and −1 from the left in the upper stage, the values +2, 0, and −2 from the left in the middle stage, and the values +1, 0, and −1 from the left in the lower stage. G represents a processing result obtained by combining the processing result of the Sobel filter in the horizontal direction and the processing result of the Sobel filter in the vertical direction.

That is, the Sobel filter expressed by equation (1) detects edges by calculating a differential value and differential direction of an image. Note that the Sobel filter of equation (1) is an example, and the individual values may be other values.

In step S33, the minimum value determining unit 82 sets the pixel corresponding to the head position of forward raster scan of the input image as a processing target pixel.

In step S34, the minimum value determining unit 82 compares the pixel values of the processing target pixel and the pixels adjacent thereto. That is, the minimum value determining unit 82 arranges the pixels of the input image in raster scan order and compares the pixel values of the processing target pixel and the pixels arranged before and after the processing target pixel.

In step 35, the minimum value determining unit 82 determines whether the pixel value of the processing target pixel is a minimum value or not with respect to the pixel values of the adjacent pixels. More specifically, if there is no adjacent pixel having a value smaller than that of the processing target pixel, the minimum value determining unit 82 regards the processing target pixel as a minimum value pixel. Furthermore, if there is a pixel that has the same value as the processing target pixel and that is determined to be a pixel not having a minimum value among the pixels that have already been processed and that are adjacent to the processing target pixel, the minimum value determining unit 82 determines that the processing target pixel does not have a minimum value.

For example, as illustrated in the upper stage of FIG. 6, when the pixel values of pixels P1 to P9 arranged in raster scan order are shown in a bar graph, whether a pixel value is a minimum value or not is determined in the following manner. That is, in a case where the processing target pixel is pixel P2, the minimum value determining unit 82 determines whether pixel P2 has a minimum value or not on the basis of the information about the difference between pixel P1 and pixel P2 and the difference between pixel P3 and pixel P2.

Figure 6:
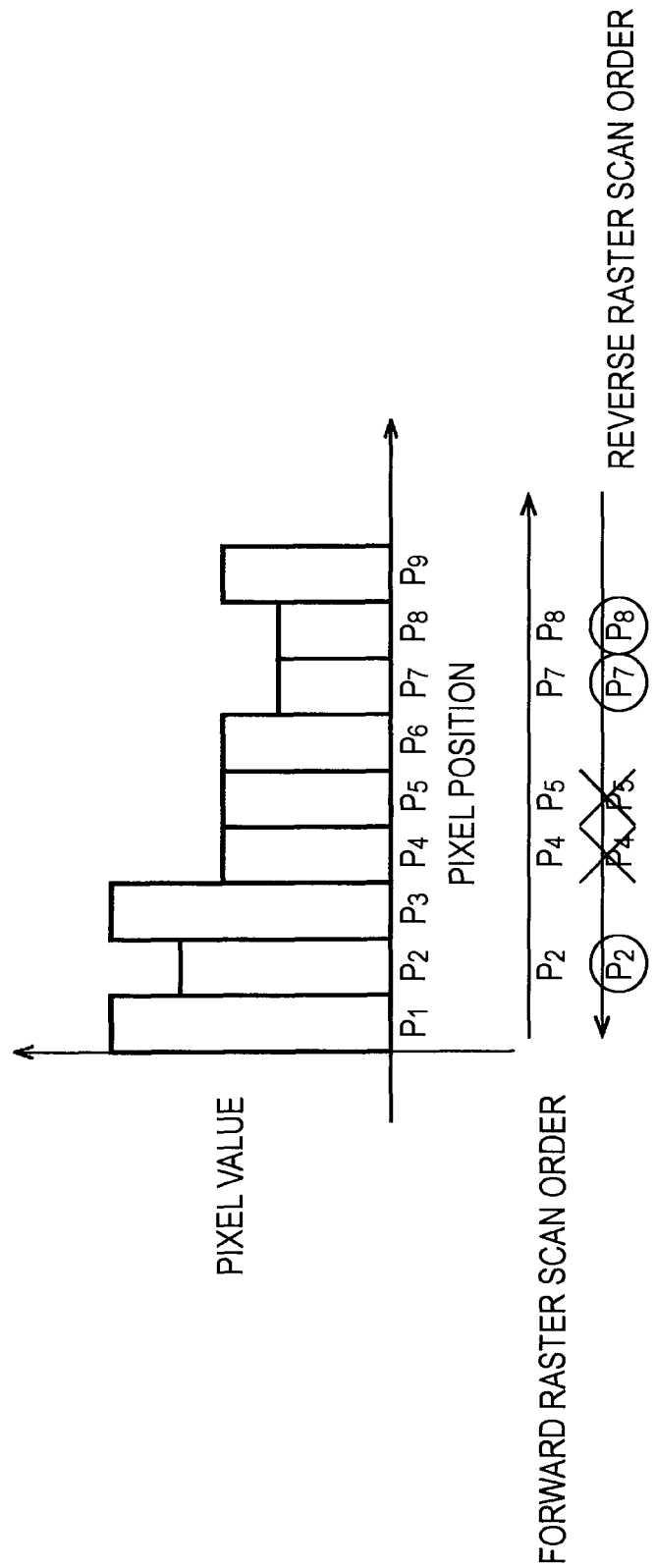
FIG. 6 is a diagram for explaining a process of selecting a pixel serving as a center of a small region.

In the upper stage of FIG. 6, the pixel value of pixel P2 is smaller than any of the pixel values of adjacent pixels P1 and p3, and there is no pixel having a pixel value smaller than that of pixel P2. Thus, the minimum value determining unit 82 determines that pixel P2 has a minimum value.

Also, in a case where the processing target pixel is pixel P3, the pixel value of pixel P3 is larger than any of the pixel values of adjacent pixels P2 and P4, and there is a pixel having a pixel value smaller than that of pixel P3. Thus, the minimum value determining unit 82 determines that the pixel value of pixel P3 is not a minimum value.

Furthermore, in a case where the processing target pixel is pixel P4, the pixel value of pixel P4 is smaller than that of adjacent pixel P3, is the same as that of pixel P5, and there is no pixel having a pixel value smaller than that of pixel P4. Thus, the minimum value determining unit 82 determines that the pixel value of pixel P4 is a minimum value.

Also, in a case where the processing target pixel is pixel P5, the pixel value of pixel P5 is the same as the pixel values of adjacent pixels P4 and P6, and there is no pixel having a pixel value smaller than that of pixel P5. Thus, the minimum value determining unit 82 determines that the pixel value of pixel P5 is a minimum value.

Furthermore, in a case where the processing target pixel is pixel P6, the pixel value of pixel P6 is the same as that of adjacent pixel P5, is larger than that of P7, and there is a pixel having a pixel value smaller than that of pixel P6. Thus, the minimum value determining unit 82 determines that the pixel value of pixel P6 is not a minimum value.

Also, in a case where the processing target pixel is pixel P7, the pixel value of pixel P7 is smaller than that of adjacent pixel P6, is the same as that of pixel P8, and there is no pixel having a pixel value smaller than that of pixel P7. Thus, the minimum value determining unit 82 determines that the pixel value of pixel P5 is a minimum value.

Furthermore, in a case where the processing target pixel is pixel P8, the pixel value of pixel P8 is the same as that of adjacent pixel P7, is smaller than that of P8, and there is no pixel having a pixel value smaller than that of pixel P8. Thus, the minimum value determining unit 82 determines that the pixel value of pixel P8 is a minimum value.

If it is determined in step S35 that the processing target pixel has a minimum value, the minimum value determining unit 82 stores the processing target pixel as a pixel having a minimum value in step S36. Note that, if it is determined in step S35 that the processing target pixel does not have a minimum value, the process in step S36 is skipped.

In step S37, the minimum value determining unit 82 determines whether there is an unprocessed pixel that has not been processed as a processing target pixel in the input image or not. If there is an unprocessed pixel, the process proceeds to step S38.

In step S38, the minimum value determining unit 82 changes the processing target pixel in forward raster scan order, and the process returns to step S34. That is, the process in steps S34 to S38 is repeated until it is determined on all the pixels of the input image in raster scan order whether the pixel value is a minimum value or not. Then, whether the pixel value is a minimum value or not is determined on all the pixels of the input image in step S37, the process proceeds to step S39.

Note that the process in steps S39 to S44 is the same as the above-described process in steps S33 to S43 except that the former is performed in reverse raster scan order and the latter is performed in raster scan order, and thus the description thereof is omitted.

Meanwhile, when the process is performed in reverse raster scan order after the process is performed in forward raster scan order in this manner, a result different from that obtained through the process in forward raster scan order may be obtained.

That is, when the process is performed in reverse raster scan order after the process is performed in forward raster scan order as in the upper stage of FIG. 6, the same result as that in the forward direction is obtained if processing target pixels are pixels P2, P7, and P8, but the result is different for pixels P4 and P5, as in the lower stage of FIG. 6. In the case of pixel P5, pixel P6 that has once been processed is determined not to have a minimum value, and then pixel P5 having the same pixel value as that of pixel P6 becomes a processing target pixel, and thus it is determined that pixel P5 does not have a minimum value. Likewise, as for pixel P4, it is determined that pixel P5 does not have a minimum value in the process in reverse raster scan order, and then pixel P4 having the same pixel as that of pixel P5 becomes a processing target pixel, and thus it is determined that pixel P4 does not have a minimum value.

As described above, the processing result of the process in forward raster scan order is different from that of the process in reverse raster scan order. Thus, in step S42, only the pixels that are determined to have a minimum value in the process in reverse raster scan order are stored as pixels having a minimum value.

In step S45, the minimum value image generating unit 83 generates a minimum value image on the basis of the information about the pixels that are determined to have a minimum value and that are stored by the minimum value determining unit 82, and supplies it together with the input image to the small region ID adding unit 63. Note that an image in which the pixels that are not determined to have a minimum value are blank is generated as the minimum value image here.

In step S46, the small region ID adding unit 63 adds small region IDs to the respective pixels that are set as minimum value pixels of the minimum value image supplied thereto. At this time, as for the pixels in the minimum value image, in a case where a pixel does not exist alone but a plurality of pixels exist while being adjacent to each other, the region constituted by those adjacent pixels is regarded as a small region, and common small region IDs are added to all the pixels constituting the small region. In this case, no small region ID is given or a value representing blank is added to the pixel that is not determined to have a minimum value.

The small region ID adding unit 63 adds the small region IDs in units of small regions using, for example, a UNION-FIND method (see "The watershed transform: definitions, algorithms, and parallellization strategies" (2000), J. B. T. M. Roerdink and A. Meijster, Fundamenta Informaticae 41, pp. 187-228).

In step S47, the small region ID adding unit 63 generates an initial small region ID map in which small region IDs are added in units of regions that are set as small regions in this manner, and supplies it together with the input image to the small region extending processing unit 64.

In step S48, the small region extending processing unit 64 extends the individual small regions in the small region ID map to the range of blank pixels having no small region ID on the basis of the input image and the initial small region ID map supplied from the small region ID adding unit 63. More specifically, the small region extending processing unit 64 repeats a process of causing the small region ID of a pixel to propagate to the pixels having no small region ID among eight pixels adjacent to the pixel in the upper, lower, left, right, upper left, upper right, lower left, and lower right directions (hereinafter also referred to as surrounding eight neighboring pixels). At this time, the process of extending the small region ID, that is, the order of propagation of the small region ID, is executed in ascending order of pixel value in the small region. This process is repeated, and after all the pixels have been added with any small region ID, the process ends.

In step S49, the small region extending processing unit 64 generates a small region ID map on the basis of the information about the IDs that are added in units of small regions, and supplies it to the small region ID mal output unit 65.

In step S50, the small region ID map output unit 65 supplies the generated small region ID map to the small region adjacent energy calculating unit 14 and the small region likelihood energy calculating unit 15.

Figure 4:
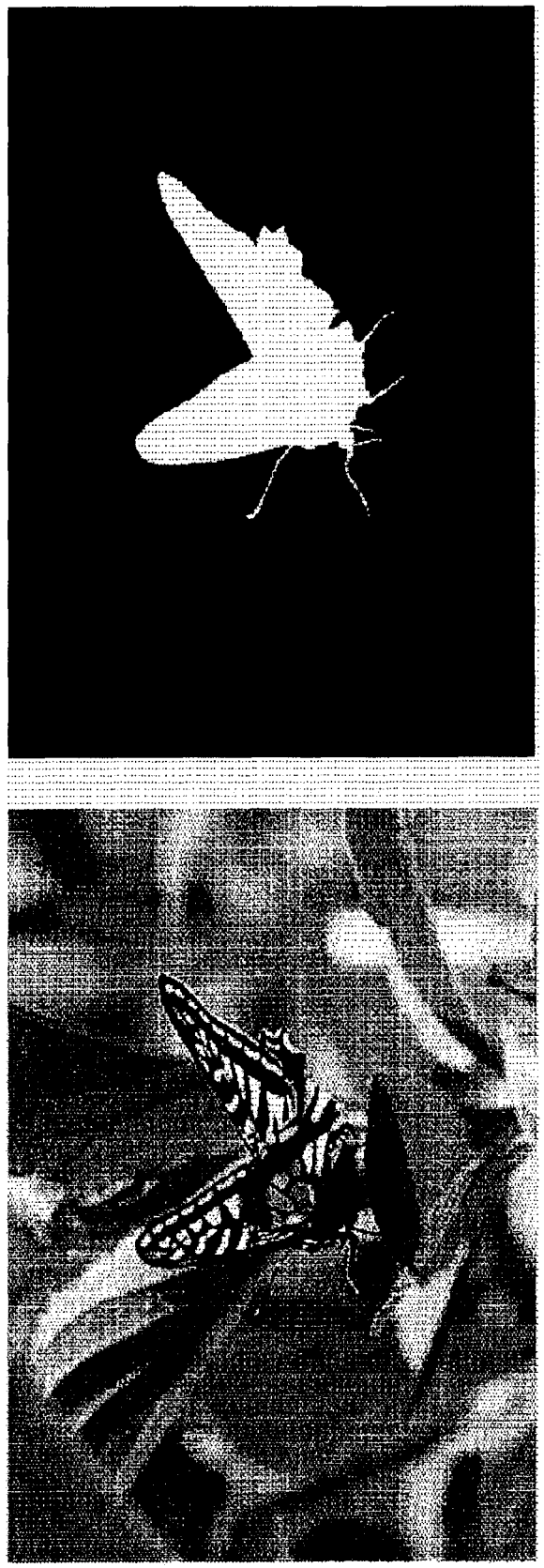
FIG. 4 is a diagram illustrating an example of an input image and a binary mask image.
Figure 7:
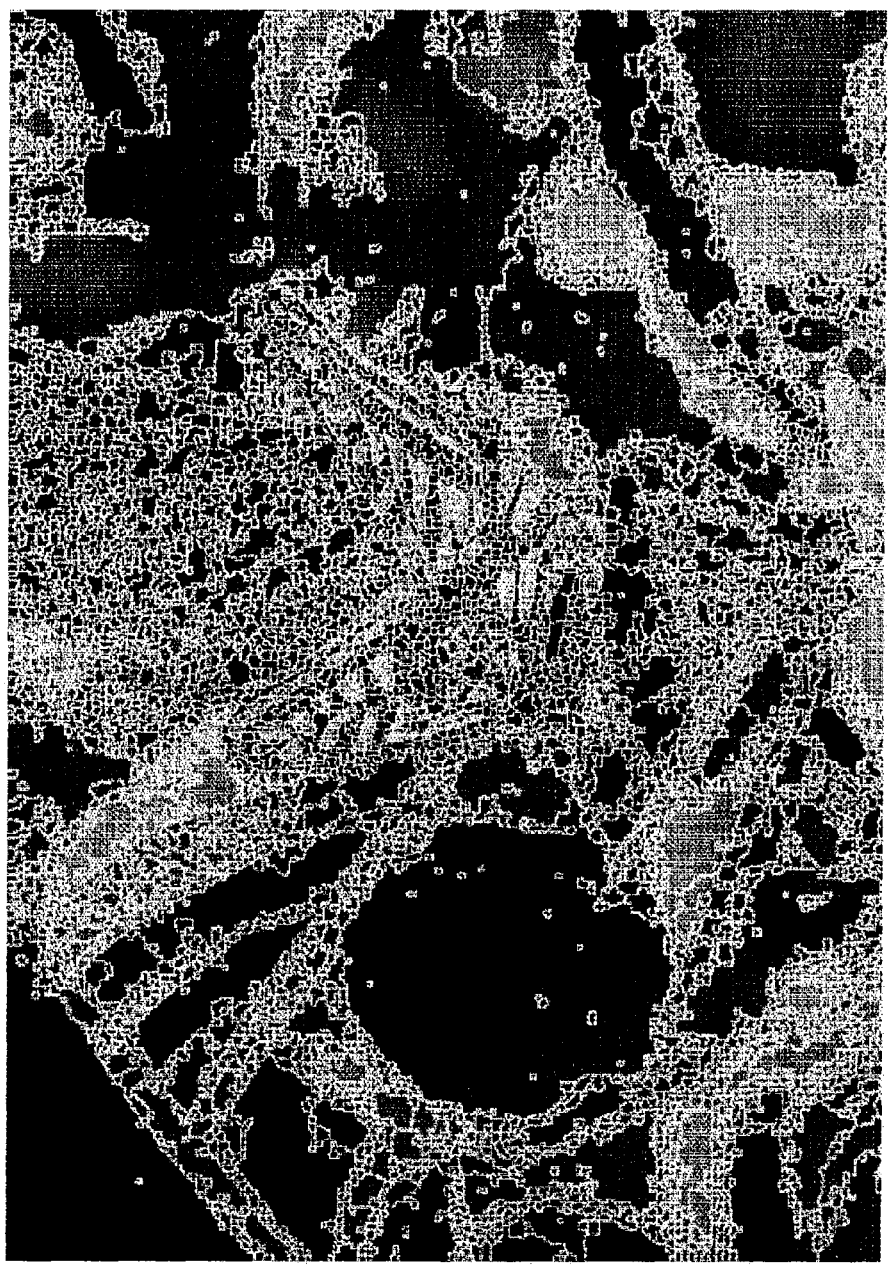
FIG. 7 is a diagram for explaining an image made up of small regions that are generated on the basis of a small region ID map.

In the foregoing process, for example, the input image illustrated in the left portion of FIG. 4 is divided with white lines to surround regions added with the same small region IDs on the basis of the small region ID map so as to generate an image, whereby the image that is divided into small regions as illustrated in FIG. 7 is generated. Then, when an object image and a background image of the input image are to be separated from each other, the process can be performed in units of small regions, not in units of pixels, by using this image. As a result, the number of processes of determining whether a region is a region bound to the object image or a region bound to the background image can be reduced, so that the capacity of the memory required for the processes can be reduced and the processing speed can be increased.

Figure 3:
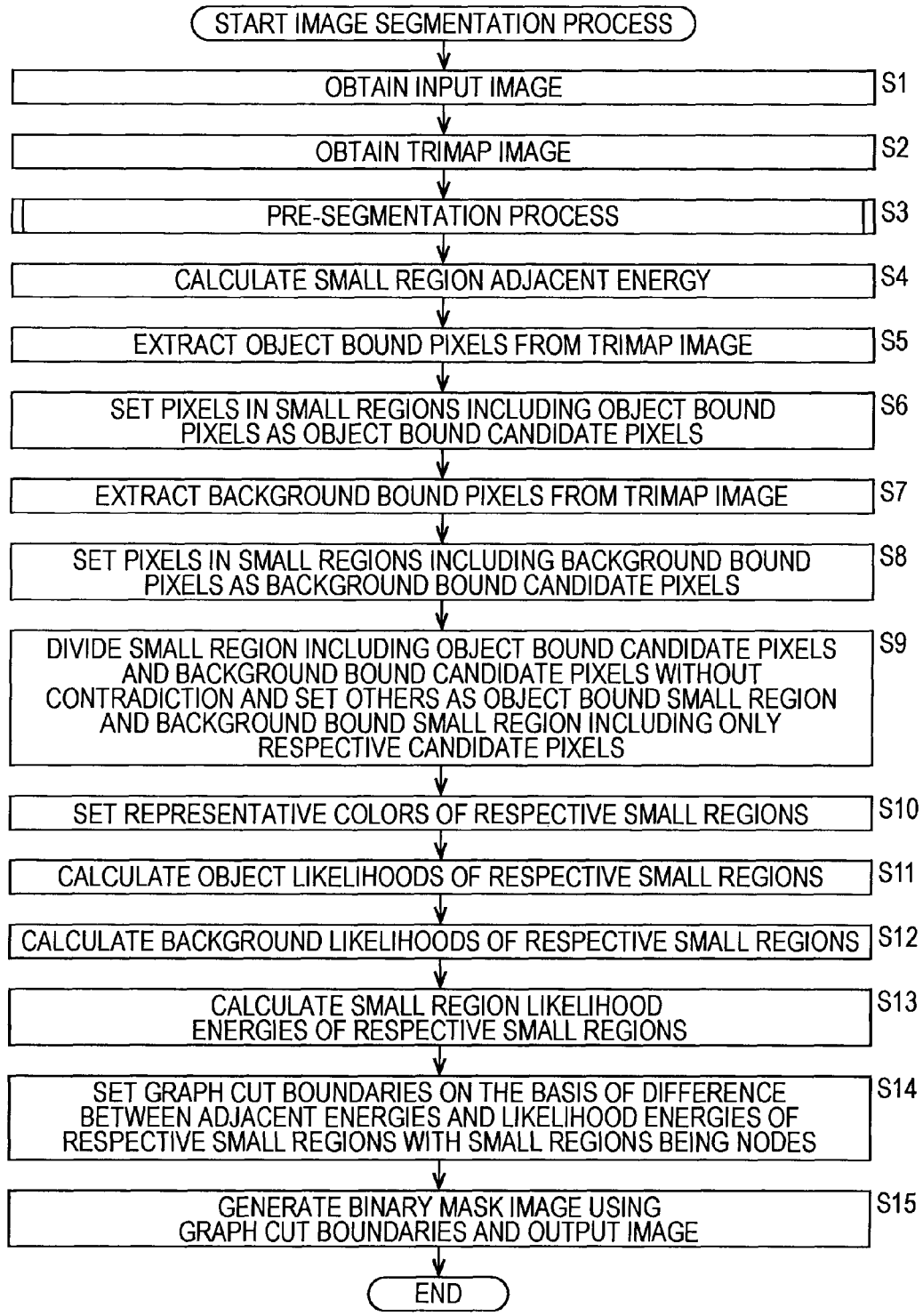
FIG. 3 is a flowchart for explaining an image segmentation process.

Now, the description returns to the flowchart in FIG. 3.

After the small region ID map is generated and is supplied together with the input image to the small region adjacent energy calculating unit 14 and the small region likelihood energy calculating unit 15 in the pre-segmentation process in step S3, the process proceeds to step S4.

In step S4, the small region adjacent energy calculating unit 14 calculates small region adjacent energies between the small regions adjacent to each other using the following equation (2) on the basis of the small region ID map and the input image. Then, the small region adjacent energy calculating unit 14 supplies the small region adjacent energies of the respective small regions serving as a calculation result, the input image, and the small region ID map to the segmentation executing unit 16.

[Math. 2]

$$E_N = \Sigma \exp(-\beta \cdot \|I_p - I_q\|^2)$$

$$\beta = (2 \langle \|I_p - I_q\|^2 \rangle)^{-1} \quad (2)$$

Here, $E_N$ represents an adjacent energy between small regions, and $I_p$ and $I_q$ represent the individual pixel values in a pair of pixels that are adjacent to each other at the boundary between small regions. Also, β represents an expected value in the entire image of the square value of the difference between the pixel values, and is a parameter for adjusting the center value in a distribution of differences between pixel values to be a value approximate to 0.5. The symbol <A> in the equation of β represents the expected value of A.

Figure 8:
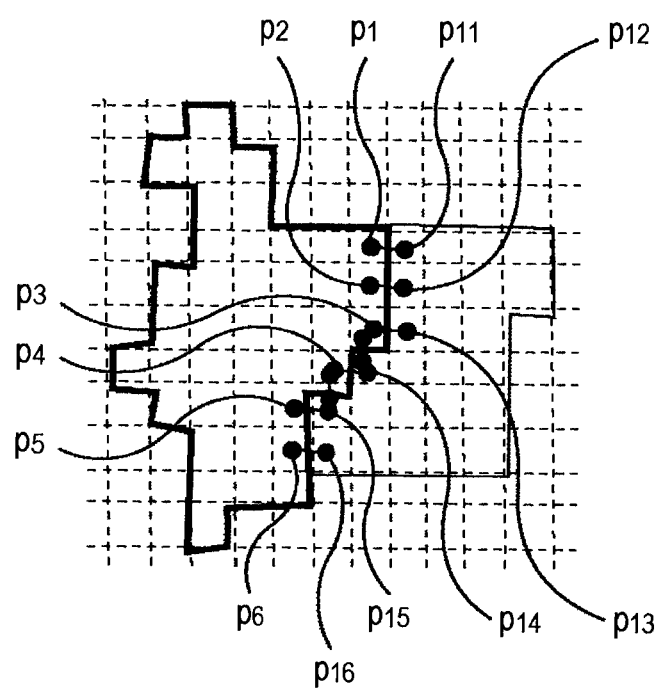
FIG. 8 is a diagram for explaining small region adjacent energy.

That is, in a case where small regions Z1 and Z2 exist as illustrated in FIG. 8, pairs of adjacent pixels are pixel P1 and pixel P11, pixel P2 and pixel P12, pixel P3 and pixel P13, pixel P3 and pixel 14, pixel P4 and pixel P14, pixel P4 and pixel P15, pixel P5 and pixel P14, and pixel P6 and pixel P16.

In this way, the adjacent energy between small regions $E_N$ is a value that is obtained by accumulating the square values of differences in pixel value between adjacent pixels of adjacent small regions in units of small regions. Thus, the adjacent energy between small regions $E_N$ is high if there are many pixels of high correlation among pixels in small regions adjacent to each other, and is low if there are many pixels in which the difference in pixel value of low correlation is large.

In step S5, the small region likelihood energy calculating unit 15 controls the bound region setting unit 31 to extract the pixels bound as the pixels of the object image, that is, object bound pixels, from the trimap image.

In step S6, the bound region setting unit 31 sets the object bound pixels in the respective small regions as object bound candidate pixels on the basis of the small region ID map.

In step S7, the small region likelihood energy calculating unit 15 controls the bound region setting unit 31 to extract the pixels bound as the pixels of the background image, that is, background bound pixels, from the trimap image.

In step S8, the bound region setting unit 31 sets the background bound pixels in the respective small regions as background bound candidate pixels on the basis of the small region ID map.

In step S9, the bound region setting unit 31 sets a small region including only object bound candidate pixels as an object bound small region and sets a small region including only background bound candidate pixels as a background bound small region. Furthermore, the bound region setting unit 31 divides a small region including both the object bound candidate pixels and background bound candidate pixels without contradiction, and sets them as an object bound small region and a background bound small region.

In step S10, the small region likelihood energy calculating unit 15 controls the representative color setting unit 32 to set representative colors of the respective small regions. More specifically, the representative color setting unit 32 calculates weighted averages of the pixel values of the pixels included in the respective small regions, thereby determining the representative colors of the respective small regions. That is, if a simple average value of the pixel values included in each small region is calculated as a representative color, an average pixel value including color mixture is obtained due to the color mixture of pixel values in the vicinity of the boundary between small regions, so that the likelihood energy described below cannot be obtained with high accuracy.

Figure 9:
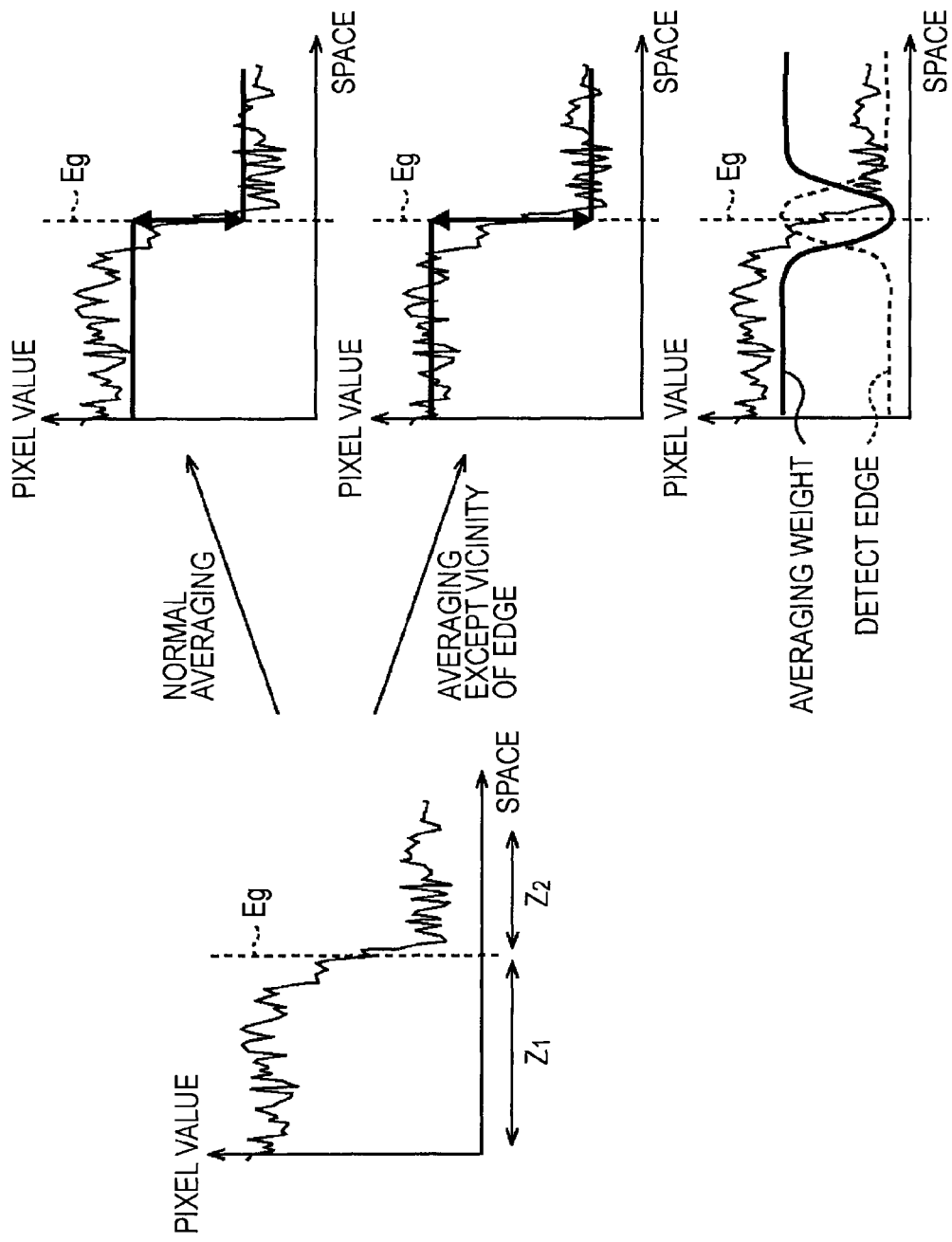
FIG. 9 is a diagram for explaining a process of setting representative colors of respective small regions.

For example, as illustrated in the left portion of FIG. 9, in a case where the waveforms of the pixel values in regions Z1 and Z2 are set, the change in pixel value is significant in the vicinity of a small region boundary Eg, and thus there are many pixel values generated by mixing many pixel values included in the small regions Z1 and Z2 adjacent to each other. Therefore, if an average value of the pixel values of all the pixels in a small region is simply calculated, a pixel value approximate to an intermediate value of both small regions is obtained rather than an average value of the pixel values in an original small region, as illustrated in the upper right stage of FIG. 9. As a result, the representative colors of the both small regions cannot be expressed correctly.

Then, as illustrated with a bold solid line in the lower right stage of FIG. 9, an averaging weight that is small in the vicinity of the boundary is set to the space indicating the positions of pixels, and the pixel values of the respective pixels are added by being multiplied by the weight. In this way, representative colors approximate to the original waveforms of the pixel values in the small regions Z1 and Z2 can be set, as illustrated in the middle right stage of FIG. 9. As a method for setting a weight that is small in the vicinity of the boundary to the space indicating the positions of pixels, the reciprocal of a differential value of a differential image shown by a broken line in the lower right stage of FIG. 9 can be used, for example.

Therefore, the representative color setting unit 32 multiplies the pixel values by a weight such that the weight is small for the pixels in the vicinity of the individual boundaries, as illustrated in the lower right stage of FIG. 9, and furthermore, integrates them to set pixel values serving as representative colors of individual small regions.

In step S11, the small region likelihood energy calculating unit 15 controls the object likelihood calculating unit 33 to calculate the object likelihoods of the respective small regions. More specifically, first, the object likelihood calculating unit 33 generates a function p(x) representing a Gaussian mixture model on the basis of an object bound small region (or a background bound small region).

That is, the object likelihood calculating unit 33 calculates an average vector μ, with an object bound small region being one cluster as a first data sample. Also, the object likelihood calculating unit 33 calculates a covariance matrix Σ, with an object bound small region being one cluster as a first data sample. Then, the object likelihood calculating unit 33 generates a Gaussian mixture model p(x) in which an object bound small region is a first data sample on the basis of the calculated average vector and covariance matrix Σ.

Here, the function p(x) of the Gaussian mixture model is a function representing the likelihood of D-dimensional data x that is given, as expressed by the following equation (3). Also, the function p(x) of the Gaussian mixture model is a total sum of D-dimensional Gaussian functions N, the number of which is K, $(x|\mu_k, \Sigma_k)$ (coefficient k: k=1, 2, . . . K) expressed by equation (4), multiplied by a weight $H_k$.

[Math. 3]

$$p(x) = \sum_{k=1}^{K} H_k N(x | \mu_k, \Sigma_k) \quad (3)$$

[Math. 4]

$$N(x | \mu, \Sigma) = \frac{1}{(2\pi)^{D/2}} \frac{1}{|\Sigma|^{1/2}} \exp\left\{-\frac{1}{2}(x-\mu)^T \Sigma^{-1}(x-\mu)\right\} \quad (4)$$

Here, the Gaussian function N(x) is a function representing the likelihood of a Gaussian model of D-dimensional data x that is classified by a coefficient k using an average vector $\mu_k$, an inverse matrix $\Sigma_k^{-1}$ of the covariance matrix $\Sigma_k$, and a determinant $|\Sigma_k|$ of the covariance matrix $\Sigma_k$, when the D-dimensional data x that is classified by the coefficient k is given.

Note that, as for the construction of the Gaussian mixture model, an Expectation Maximization method is known. For detail, see "Pattern Recognition and Machine Learning" (2006), Bishop, Christopher M., Series: Information Science and Statistics, ISBN: 978-0-387-31073-2).

In step S12, the small region likelihood energy calculating unit 15 controls the background likelihood calculating unit 34 to calculate the background likelihoods of the respective small region. Note that, in this process, the background likelihoods are calculated in a method similar to that performed by the object likelihood calculating unit 33.

In step S13, the small region likelihood energy calculating unit 15 calculates the small region likelihood energies of the respective small regions on the basis of the object likelihoods of the respective small regions calculated by the object likelihood calculating unit 33 and the background likelihoods of the respective small regions calculated by the background likelihood calculating unit 34. More specifically, the small region likelihood energy calculating unit 15 calculates the small region likelihood energies of the respective small regions using the following equation (5) and supplies a calculation result to the segmentation executing unit 16.

[Math. 5]

$$E_L = \log(p_{OBJ}(x)) - \log(p_{BG}(x)) \quad (5)$$

Here, $E_L$ represents a small region likelihood energy, $P_{OBJ}(x)$ represents an object likelihood, $P_{BG}(x)$ represents a background likelihood, and x represents a representative color of the small region.

That is, the small region likelihood energy $E_L$ is higher as the difference between the object likelihood and the background likelihood in the representative color x is smaller, and is lower as the difference between the object likelihood and the background likelihood is larger.

In step S14, the segmentation executing unit 16 executes a segmentation process on the basis of the small region adjacent energies, small region likelihood energies, input image, and small region ID map. With this process, the segmentation executing unit 16 sets graph cut boundaries using the small regions as nodes. That is, the segmentation executing unit 16 constructs a graph from the small region ID map by using the small regions as nodes, sets the small region likelihood energies and small region adjacent energies to the edges of the graph, and calculates the graph cut boundaries. As a result, the edges of the graph are set on the basis of a set of small regions, not a set of pixels.

In step S15, the segmentation executing unit 16 sets a value representing an object image to the pixels belonging to the object image in units of small regions along the calculated graph cut boundaries, and sets a value representing a background image to the pixels belonging to the background image. With this process, the segmentation executing unit 16 generates a binary mask image made up of binary numbers representing the object and background illustrated in the right portion of FIG. 4, corresponding to the input image illustrated in the left portion of FIG. 4, for example, and supplies it to the output unit 17. The output unit 17 outputs the binary mask image generated by the segmentation executing unit 16, and the process ends.

With the foregoing process, when a binary image is to be generated using a graph cut process, an input image is processed after being divided into small regions through the pre-segmentation process, so that the graph cut process can be performed using the small regions, not pixels, as nodes. As a result, the capacity of the memory required for the process can be reduced, and the processing speed can be increased.

Also, with the foregoing process, a weighted average of a small region is used as a representative color of the small region, and the weight of pixel values in the vicinity of a boundary is reduced, so that color mixture of a surrounding small region can be reduced. As a result, even if an image segmentation process, such as the graph cut method, is performed in units of small regions, a result similar to that obtained through a process in units of pixels can be obtained.

Additionally, a description has been given above of an example of directly generating a differential image from an input image by the foregoing pre-segmentation executing unit. For example, an edge preserving smoothing filter may be applied before calculating a differential image, so that edges can be easily left.

That is, the pre-segmentation executing unit 13 constructs small regions while preserving the edges of the original image. However, by applying the edge preserving smoothing filter, small regions are further extended with the edges being preserved, so that the memory can be further saved and the processing speed can be further increased.

Examples of the edge preserving smoothing filter for an image include a Meanshift Filter and a Bilateral Filter.

The Meanshift Filter is a filter for performing smoothing with edges being left, by focusing attention on a local region of an image, finding a position where the density is the highest in the region, and moving or updating a processing target pixel in the direction of the highest density (see "Mean shift: a robust approach toward feature space analysis", Comaniciu, D.; Meer, P., Pattern Analysis and Machine Intelligence, IEEE Transactions on Volume 24, Issue 5, May 2002).

On the other hand, the Bilateral Filter is a filter for performing smoothing with edges being left, in a method of focusing attention on a local region of an image and performing smoothing by mixing two weights of a distance and a luminance difference from a target pixel (see "Bilateral filtering for gray and color images", Tomasi, C. Manduchi, R., International Conference on Computer Vision, 1998).

Furthermore, a description has been given of an example in which the foregoing pre-segmentation executing unit 13 uses a Sobel filter for calculating a differential image. However, another edge detection filter may be applied. For example, a Canny edge detection filter or a Laplacian filter may be used.

Also, for the weighted average used by the representative color setting unit 32, not only the reciprocal of a differential value of a differential image but also another method may be used. As the weighted average used by the representative color setting unit 32, the reciprocal of a difference in shade of surrounding pixels may be used with a minimum value at the center of a small region being a center color, or variable weighted average filtering may be used, for example. Also, as the weighted average used by the representative color setting unit 32, k nearest neighbor average filtering may be used, in which k pixels are extracted from among pixels of a local small region in order from the pixel having a shading level nearest to that of the center color to obtain an average color, for example.

Furthermore, among the pixel values of the respective pixels of a differentiated image, a pixel value that is equal to or smaller than a certain threshold may be set to zero, thereby performing output by reducing the number of pixels at the center of the small region, reducing the processing load, and increasing the processing speed.

Furthermore, as the weighted average used by the representative color setting unit 32, the reciprocal of a distance between the center of a small region and a pixel included in the small region may be merely used for calculating a weight, or a geodesic distance may be calculated and used.

Also, in the case of calculating a geodesic distance, a path where the degree of change in pixel value is the lowest may be selected, and an integrated amount of change in pixel value may be used as the distance.

Furthermore, a description has been given of an example of using a pre-segmentation process together with segmentation of an image, but a small region ID map obtained through the pre-segmentation process may be used alone or may be used together with another algorithm.

That is, by obtaining a small region ID map, that is, a small region image, through a pre-segmentation process, the image may be presented as a simple mosaic image, or texture information may be extracted by subtracting the small region image from an input image.

Also, in combination with the stereo image correspondence or object tracking of a computer vision problem, the processing speed and robustness may be increased.

Furthermore, a segmentation process may be executed using a result of a pre-segmentation process in accordance with the resolution of an image, for example, only when the resolution is high and when the number of small regions to be generated through the pre-segmentation process is expected to be sufficiently smaller than a certain number of small regions. By executing the pre-segmentation process only when a great effect can be obtained, the process can be efficiently performed.

Alternatively, a segmentation process may be executed using a result of a pre-segmentation process only when the number of small regions generated through the pre-segmentation process is sufficiently smaller than a certain number of small regions. That is, by using a processing result of a pre-segmentation process only in a case where the load of an image segmentation process can be significantly reduced by the pre-segmentation process, the result of the pre-segmentation process can be effectively used.

Meanwhile, the foregoing series of processes can be executed by hardware and can be executed by software. In a case where the series of processes are executed by software, a program constituting the software is installed via a recording medium to a computer incorporated in dedicated hardware or a general-purpose personal computer capable of executing various types of functions by being installed with various types of programs.

Figure 10:
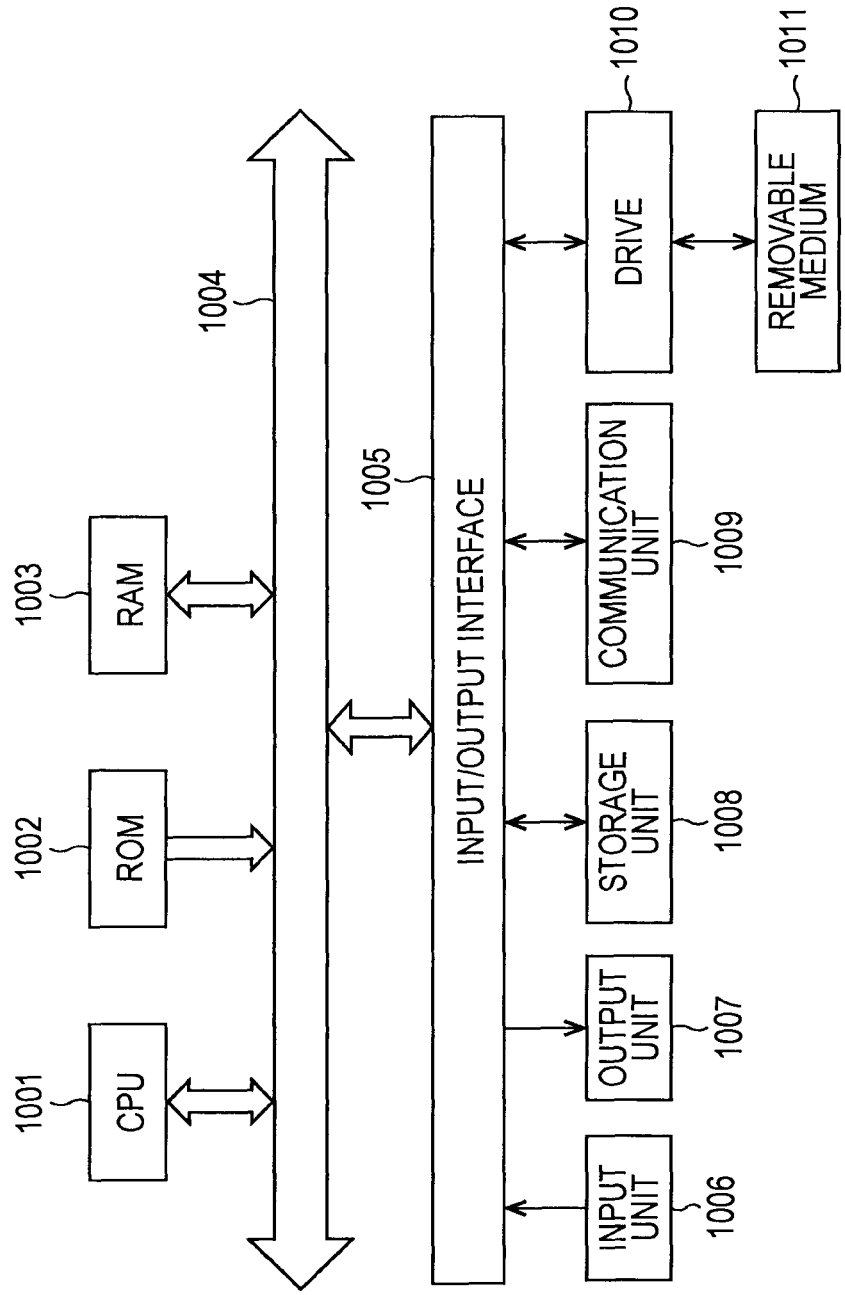
FIG. 10 is a diagram illustrating a configuration example of a general-purpose personal computer.

FIG. 10 illustrates a configuration example of a general-purpose personal computer. This personal computer includes a CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

An input unit 1006 made up of input devices, such as a keyboard and a mouse used by a user to input an operation command, an output unit 1007 for outputting a processing operation screen or an image of a processing result to a display device, a storage unit 1008 made up of a hard disk drive or the like for storing programs and various types of data, and a communication unit 1009 that is made up of a LAN (Local Area Network) adaptor or the like and that executes a communication process via a network represented by the Internet are connected to the input/output interface 1005. Also, a drive 1010 is connected, the drive 1010 reading data from/writing data on a removable medium 1011, such as a magnetic disk (including a flexible disk), an optical disc (including a CD-ROM (Compact Disc-Read Only Memory) and a DVD (Digital Versatile Disc)), a magneto-optical disc (including an MD (Mini Disc)), or a semiconductor memory.

The CPU 1001 executes various types of processes in accordance with a program stored in the ROM 1002 or a program that is read from the removable medium 1011, such as a magnetic disk, an optical disc, a magneto-optical disc, or a semiconductor memory, is installed in the storage unit 1008, and is loaded from the storage unit 1008 to the RAM 1003. Also, the data necessary for the CPU 1001 to execute various types of processes is stored in the RAM 1003 as necessary.

Note that, in this specification, the steps describing a process procedure may of course be performed in time series along the described order, or may be performed in parallel or individually instead of being performed in time series.

REFERENCE SIGNS LIST

11 input image obtaining unit, 12 trimap image obtaining unit, 13 pre-segmentation executing unit, 14 small region adjacent energy calculating unit, 15 small region likelihood energy calculating unit, 16 segmentation executing unit, 17 output unit, 61 image obtaining unit, 62 small region center selecting unit, 63 small region ID adding unit, 64 small region extending processing unit, 65 small region ID map output unit

The invention claimed is:

1. An image processing apparatus for outputting a binary mask image, comprising:
    trimap image obtaining means for obtaining an input image and a trimap image in which the input image is divided into at least an object region and a background region;
    pre-dividing means for classifying pixels in the input image on the basis of correlation among the pixels, thereby dividing the input image into a set of small regions;
    small region adjacent energy calculating means for calculating a small region adjacent energy on the basis of a difference in pixel value of a pixel set at the vicinity of a boundary of a pair of small regions adjacent to each other in the set of small regions;

small region likelihood energy calculating means for selecting the object region and the background region in the set of small regions on the basis of the trimap image, constructing a probability model function, obtaining object likelihoods and background likelihoods of the respective small regions using the probability model function, and calculating a small region likelihood energy using the object likelihoods and the background likelihoods;

dividing means for dividing the input image into a binary mask image of the foreground and the background using the small region adjacent energy and the small region likelihood energy; and output means for outputting the binary mask image divided by the dividing means, wherein the small region likelihood energy calculating means calculates the object likelihoods and the background likelihoods using the probability model function and using weighted average colors of the respective small regions.

2. The image processing apparatus according to claim 1, wherein the pre-dividing means further includes small region center selecting means for setting pixels having a minimum value of a pixel value in a forward direction of raster scan as small region center candidate pixels among the individual pixels in the input image, and then selecting a pixel having a minimum value in a reverse direction of the raster scan as a small region center from among the small region center candidate pixels.

3. The image processing apparatus according to claim 2, wherein the small region center selecting means further includes differential processing means for performing a differential process on the input image, and sets a pixel value equal to or smaller than a desired threshold among pixel values of respective pixels of the input image on which the differential process has been performed by the differential processing means to zero, thereby performing output by reducing the number of pixels at the small region center.

4. The image processing apparatus according to claim 1, wherein the pre-dividing means further includes small region extending processing means for setting order of extending one or more of the small region regions to ascending order of quantized pixel value.

5. An image processing method for an image processing apparatus for outputting a binary mask image, comprising:

a trimap image obtaining step of obtaining an input image and a trimap image in which the input image is divided into at least an object region and a background region;

a pre-dividing step of classifying pixels in the input image on the basis of correlation among the pixels, thereby dividing the input image into a set of small regions;

a small region adjacent energy calculating step of calculating a small region adjacent energy on the basis of a difference in pixel value of a pixel set at the vicinity of a boundary of a pair of small regions adjacent to each other in the set of small regions;

a small region likelihood energy calculating step of selecting the object region and the background region in the set of small regions on the basis of the trimap image, constructing a probability model function, obtaining object likelihoods and background likelihoods of the respective small regions using the probability model function, and calculating a small region likelihood energy using the object likelihoods and the background likelihoods;

a dividing step of dividing the input image into a binary mask image of the foreground and the background using the small region adjacent energy and the small region likelihood energy; and an output step of outputting the binary mask image, wherein the obtaining of the object likelihoods and the background likelihoods includes calculating the object likelihoods and the background likelihoods using the probability model function and using weighted average colors of the respective small regions.

6. A non-transitory computer-readable medium including instructions, executable by a processor, to cause an image processing apparatus to perform a method for outputting a binary mask image, the method comprising:

a trimap image obtaining step of obtaining an input image and a trimap image in which the input image is divided into at least an object region and a background region;

a pre-dividing step of classifying pixels in the input image on the basis of correlation among the pixels, thereby dividing the input image into a set of small regions;

a small region adjacent energy calculating step of calculating a small region adjacent energy on the basis of a difference in pixel value of a pixel set at the vicinity of a boundary of a pair of small regions adjacent to each other in the set of small regions;

a small region likelihood energy calculating step of selecting the object region and the background region in the set of small regions on the basis of the trimap image, constructing a probability model function, obtaining object likelihoods and background likelihoods of the respective small regions using the probability model function, and calculating a small region likelihood energy using the object likelihoods and the background likelihoods;

a dividing step of dividing the input image into a binary mask image of the foreground and the background using the small region adjacent energy and the small region likelihood energy; and an output step of outputting the binary mask image, wherein the obtaining of the object likelihoods and the background likelihoods includes calculating the object likelihoods and the background likelihoods using the probability model function and using weighted average colors of the respective small regions.

* * * * *